United States Patent [19]

Hunt

[11] 3,747,959

[45] July 24, 1973

[54] NUCLEAR FUEL ELEMENT IDENTIFICATION METHOD

[75] Inventor: John T. Hunt, Pittsburgh, Pa.

[73] Assignee: The United States of America as represented by the United States Atomic Energy Commission

[22] Filed: July 21, 1971

[21] Appl. No.: 164,760

[52] U.S. Cl. .......... 283/7, 40/2.2, 40/306, 283/9

[51] Int. Cl. .......... B42d 15/00

[58] Field of Search .......... 283/6, 7, 8, 21; 40/22, 2, 307

[56] References Cited

UNITED STATES PATENTS

| | | | |
|---|---|---|---|
| 3,052,999 | 11/1962 | Sedgwick et al. | 40/2.2 |
| 3,482,331 | 12/1969 | Gazale | 35/30 |
| 3,543,241 | 11/1970 | Leuck | 40/2 R |

*Primary Examiner*—Robert W. Michell
*Assistant Examiner*—Wenceslao J. Contreras
*Attorney*—Roland A. Anderson

[57] ABSTRACT

Individual objects are identified within a multiplicity of the objects by an identification method which comprises establishing a first selected number of markable positions on each of the individual objects and placing a second selected number of identical identifying marks within the markable positions. The location of the second number of marks within the markable positions on each of the objects serves to identify that object within the multiplicity.

1 Claim, 1 Drawing Figure

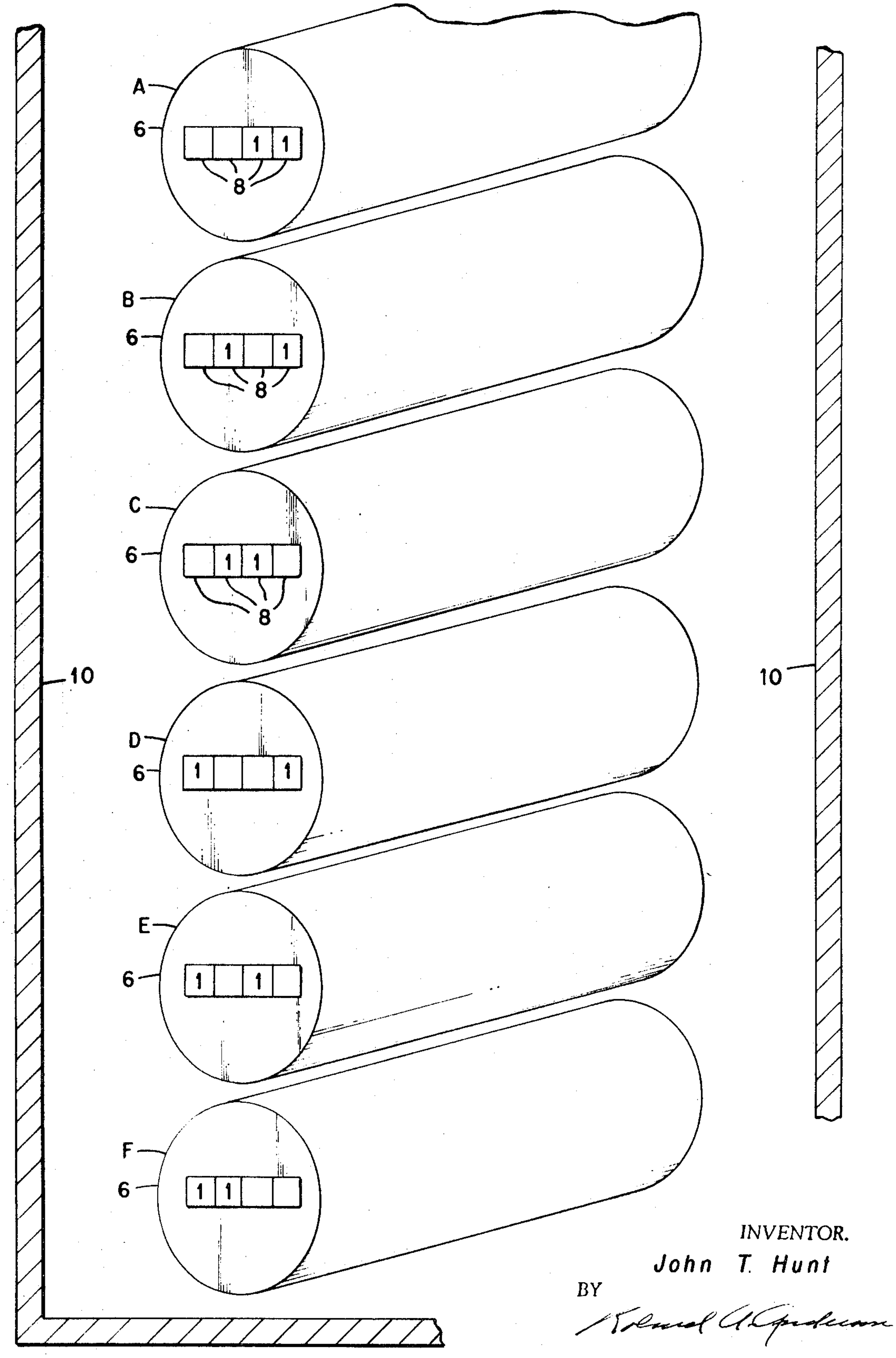
INVENTOR.
John T. Hunt
BY
ATTORNEY.

NUCLEAR FUEL ELEMENT IDENTIFICATION METHOD

BACKGROUND OF THE INVENTION

This invention was made under, or in the course of, a contract with the United States Atomic Energy Commission.

This invention relates to identification methods and, in particular, to identification methods which will prevent the inadvertent or intentional alteration of the identification markings.

In the past several different methods have been used to provide object identification. One method is to merely stamp a number or identifying symbol into the object. A second and more common method is the use of identifying symbols which represent a binary numbering scheme. The binary numbering scheme is a code in which each allowable space or marking position has one of two possible states, usually a blank or a symbol. The number or digit represented is decoded from the particular combination of symbols and blanks. The binary numbering system is advantageous in that only a single symbol, produced possibly a number of times, is necessary in conjunction with the blanks to provide an easy identifying method. However, the binary numbering system has a great disadvantage in that the intentional or inadvertent addition of a single symbol into one or more of the existing blanks will completely change the identified digit. Furthermore, the fact that the digit had been changed will not be apparent to one reading the code. Thus if a particular object is identified with a particular binary numbering scheme and an additional symbol, which may be, for example, a stamped notch, is added to the scheme, the identified digit will not only change, but an individual reading the identifying code will not be aware of the fact that the digit has been changed.

This invention provides an identification method which has the advantage of the binary numbering scheme, that only a single iden-tification symbol in conjunction with blanks serves to identify the objects, yet does not have the disadvantage of the binary scheme, since the addition of an additional identifying symbol to a marked object will immediately be apparent to any individual reading the identifying code.

SUMMARY OF THE INVENTION

The invention is an identification method for identifying individual objects within a number of the objects. Each object to be identified has established thereupon a number of substantially identical markable positions. These positions may be, for example, boxes or blank positions in a particular order or location on the object. The identity of particular objects is established by placing a number of substantially identical identifying marks within said markable positions. These marks may be, for example, indentations or notches stamped into the face of the object within the markable positions thereupon. The identity of particular objects is determined by the location of the identifying marks within the markable positions on each of the objects. The total number of marks within the total number of positions available on any one object is always uniform for a given set of objects which are to be identified. It is thus the location of the marks, rather than their number, which determines the identity of the individual objects.

This method of identification is simple and, like the binary code, requires only a signal identifying symbol, such as an identation or notch to be made in the object. However, since the total number of identifying marks made in any one object is always constant, the addition of an additional identifying mark, either through sabotage or accident, will immediately be apparent to one reading the identifying code because the number of marks will then be greater than the constant number established as the total number of marks to be used within a given set of identified objects.

It is thus an object of the invention to provide a simple numbering scheme for identifying individual objects within a multiplicity of the objects which is non-convertible in that it is not possible to change the identity symbolized on a particular object by the inadvertent or intentional addition of an additional indentifying mark. Other objects will become apparent from a reading of the specification and claims which follow.

DESCRIPTION OF THE DRAWING

The drawing illustrates an example of the inventive method of identification as applied to six individual objects.

DESCRIPTION OF THE PREFERRED EMBODIMENT

As shown by the drawing, a number of individual objects 6, identified by the letters A through F, are to be individually identified within the multiplicity. A particular code is assigned to each individual object A through F as follows: A first selected whole number of substantially identical markable positions 8, in this example, four positions, are established on each of said objects 6. The positions may be boxes 8 indicated in the figure, or merely selected locations on the object. The identity of the individual objects, A through F, is determined by the placing of a second selected number of identical identifying marks, which in this case are ones, 1, within the established markable position 8. The total number of marks, or ones, to be used is a constant number which is less than the first selected number of identical markable positions, in this case four. In the figure this second selected number of marks is two; that is, there can be no more than two marks on any one object 6. Note that only a single mark may be placed in any one position 8, or the individual position 8 may be left blank. It is the location of the second selected number of marks within the markable position 8 on each of the objects which serves to identify that object within the multiplicity.

In the example given in the FIGURE; the six object 6 identified A through F each have individual identifying symbols represented by a combination of blanks and ones in the markable positions 8 on each element. No two symbols are identical. In the first case, that of object A, two blanks are followed by two 1's. In the second object, object B, a blank is followed by a 1 which is followed by a second blank which is followed by another 1, etc. No two objects have been identically identified since the arrangement of 1's and blanks is different for each object. Yet, it is noted that no more than two 1's and no less than two 1's exist in any one battery of established markable positions 8 on any one object 6.

The identification method illustrated in the FIGURE is only a single case where 6 objects are identified individually using a method of identification where the first selected number of markable positions is four and the number of marks used is two. For other numbers of objects a different number of positions and number of marks within those positions will serve to identify additional types of objects. The following table gives examples of the number of types of individual objects which can be individually identified using a particular number of markable positions and a particular number of individual marks within those markable positions:

| Number of Positions | Number of Marks | Number of Types |
|---|---|---|
| * 2 | 1 | 2 |
| 2 | 2 | 1 |
| * 3 | 1 | 3 |
| 3 | 2 | 3 |
| 3 | 3 | 1 |
| 4 | 1 | 4 |
| * 4 | 2 | 6 |
| 4 | 3 | 4 |
| 4 | 4 | 1 |
| 5 | 1 | 5 |
| * 5 | 2 | 10 |
| 5 | 3 | 10 |
| 5 | 4 | 5 |
| 5 | 5 | 1 |
| 6 | 1 | 6 |
| 6 | 2 | 15 |
| * 6 | 3 | 20 |
| 6 | 4 | 15 |
| 6 | 5 | 6 |
| 6 | 6 | 1 |
| etc. | | |

The table is determined by the combination formula:

$$n!/r!\ (n-r)!$$

where $n$ = number of positions $r$ = number of marks $r = n/2$, rounded down to next whole number The lines marked with an asterisk in the above table represents possibly the most efficient use of the number of positions, since they allow the largest number of types to be identified therewith.

It will be noted that if one or more extra marks were to be added to an object, anyone reading the object identification system to determine identity of an object will immediately note that an additional mark has been added to that element. For example, if three marks were to appear on an object shown in the drawing, it would be readily apparent that the object's identification system had been altered.

This invention is particularly useful in identifying nuclear fuel or poison elements to be used in a given nuclear reactor core. These elements may be, for example, fuel or poison rods which appear identical but individually have particular nuclear or poison characteristics. It is vital that their placement within the reactor be in accordance with the particular design of the core. In the FIGURE, consider objects 6 to be fuel or poison element arranged within the core of a reactor 10. Using this identifying system, perhaps on the end of the particular element, gives a scheme whereby the final assembly can be checked by looking at the end of the core to make sure that the proper element types are in the right positions and orientation within the reactor. The physical markings, which may be by notches, will be permanent and will be maintained throughout the life of the nuclear reactor core; yet if an additional notch or mark is inadvertently or intentionally placed at the end or edge of the element, it will be readily apparent that such alteration has taken place.

This invention therefore provides a non-convertible object identification method. The invention has been described in detail with a single example of one species of the invention to afford an understanding thereof but reference should be made only to the following claims to determine the actual scope of the invention.

I claim:

1. A nuclear fuel assembly featuring a plurality of individualized, tamper-proof, identifiable fuel elements including a distribution of a set of identical symbols within a prescribed area of each of said elements, said symbols positioned therein in a varied but uniquely recognizable pattern, comprising:

said plurality of nuclear fuel elements arranged in a fixed orientation with corresponding locations exposed to view;

said locations each including $n$ equal markable positions, the number of said identical symbols selectively positioned within each of the corresponding locations being $r$, wherein $r$ is $n/2$, rounded down to the next whole number; said plurality of elements being defined to be less than or equal to $$(n!)/(r!\ (n-r)!$$

so that an impression of each of the $r$ identical symbols within a different one of said $n$ equal positions in a modified binary arrangement results in a uniquely individualized pattern whereby inadvertent or intentional addition of one or more identifying symbols into one or more of said markable positions will be readily apparent to any individual viewing the symbols, thereby affording a measure of security to any such inadvertent or intentional additions.

* * * * *